US009300700B2

(12) United States Patent
Ning et al.

(10) Patent No.: US 9,300,700 B2
(45) Date of Patent: Mar. 29, 2016

(54) METHOD AND TERMINAL FOR EDITING INFORMATION IN SOCIAL NETWORK SERVICE APPLICATIONS

(71) Applicant: TENCENT TECHNOLOGY (SHENZHEN) COMPANY LIMITED, Shenzhen (CN)

(72) Inventors: Cheng Gong Ning, Shenzhen (CN); Xiao Jun Huang, Shenzhen (CN); Ming Zhong Ji, Shenzhen (CN); Ming Hui Wang, Shenzhen (CN); Xue Ke Huang, Shenzhen (CN); Zhu Liang, Shenzhen (CN); Zhi Hao Zheng, Shenzhen (CN); Hui Xing Wang, Shenzhen (CN); Hua Bin Xu, Shenzhen (CN); Guang Hai Wen, Shenzhen (CN); Zhi Hua Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 347 days.

(21) Appl. No.: 14/020,608

(22) Filed: Sep. 6, 2013

(65) Prior Publication Data
US 2014/0074933 A1   Mar. 13, 2014

(30) Foreign Application Priority Data
Sep. 7, 2012   (CN) .......................... 2012 1 0329911

(51) Int. Cl.
*G06F 15/173*   (2006.01)
*H04L 29/06*   (2006.01)
(Continued)

(52) U.S. Cl.
CPC ............... *H04L 65/40* (2013.01); *G06Q 10/10* (2013.01); *G06Q 50/01* (2013.01); *H04L 65/4084* (2013.01)

(58) Field of Classification Search
CPC .... H04L 65/40; H04L 65/4084; G06Q 10/10; G06Q 50/01; H04N 21/21805; H04N 21/23424; H04N 21/2668; H04N 21/4532; H04N 21/41407; G08B 13/19656
See application file for complete search history.

(56) References Cited

U.S. PATENT DOCUMENTS

2002/0135698 A1\* 9/2002 Shinohara ............... H04H 60/07
348/473
2005/0198211 A1\* 9/2005 Park ...................... H04L 65/602
709/219
(Continued)

FOREIGN PATENT DOCUMENTS

CN          1816090       8/2006
JP       2006-331122    12/2006
(Continued)

OTHER PUBLICATIONS

Jiang Jiang (Jul. 15, 2012) "Research and Realization of Mobile Blog Based on Android Systems," Chinese Excellent Master's Degree Thesis; 8 pages with English translation of relevant portions.
(Continued)

*Primary Examiner* — Ario Etienne
*Assistant Examiner* — Kidest Mendaye
(74) *Attorney, Agent, or Firm* — Morrison & Foerster LLP

(57) ABSTRACT

The present disclosure discloses a method of editing information in a social network service ("SNS") application, and a terminal for the same. The method can comprise: sending from a command terminal to an execution terminal a multimedia information obtaining command while the command terminal is executing an editing operation in an editing area of an SNS application; obtaining multimedia information by the execution terminal in accordance with the multimedia information obtaining command; sending the obtained multimedia information to the command terminal; and inserting the multimedia information by the command terminal into the editing area of the SNS application. The present disclosure accomplishes information editing via inter-terminal interaction, simplifies the process of information editing operation, increases the convenience of information editing, and enhances the SNS application's user loyalty.

7 Claims, 13 Drawing Sheets

(51) Int. Cl.
*G06Q 50/00* (2012.01)
*G06Q 10/10* (2012.01)

(56) References Cited

U.S. PATENT DOCUMENTS

| | | | | |
|---|---|---|---|---|
| 2008/0168175 A1* | 7/2008 | Tran | G06Q 10/10 | 709/229 |
| 2010/0153520 A1* | 6/2010 | Daun | G11B 27/034 | 709/218 |
| 2012/0005287 A1* | 1/2012 | Gadel | H04L 12/5835 | 709/206 |
| 2012/0124178 A1* | 5/2012 | Sparks | H04L 67/1078 | 709/219 |
| 2013/0076918 A1* | 3/2013 | Park | H04N 1/00251 | 348/207.11 |
| 2013/0093897 A1* | 4/2013 | Fan | H04N 7/181 | 348/159 |

FOREIGN PATENT DOCUMENTS

| | | |
|---|---|---|
| JP | 2008-078836 | 4/2008 |
| JP | 2008078836 A * | 4/2008 |
| JP | 2008-129841 | 6/2008 |

OTHER PUBLICATIONS

Li Wei Zol (Aug. 2, 2011) "How is 1+1 larger than 2—Technique to play Apple mobile phones and tablets in a combinatorial way," located at http://pad.zol.com.cn/242/2420233.html; 4 pages with English translation of relevant portions.

First Office Action dated Oct. 29, 2014, directed towards CN Application No. 201203299 11.X with concise explanation of relevancy; 9 pages.

Second Office Action dated Mar. 12, 2015, directed towards CN Application No. 201203299 11.X with concise explanation of relevancy; 9 pages.

Third Office Action dated Jun. 25, 2015, directed towards CN Application No. 201203299 11.X with concise explanation of relevancy; 15 pages.

Japanese Office Action dated Sep. 15, 2015, directed to JP Application No. 2014-557994; with concise explanation of relevance; 5 pages.

Office Action dated Dec. 21, 2015, directed towards counterpart Korean Application No. 10-2014-7027980, with concise explanation of relevancy; 6 pages.

* cited by examiner

METHOD AND TERMINAL FOR EDITING INFORMATION IN SOCIAL NETWORK SERVICE APPLICATIONS

CROSS REFERENCE TO RELATED APPLICATION

This application claims the priority benefit of Chinese Patent Application No. 201210329911.X, filed Sep. 7, 2012, the contents of which are incorporated by reference herein in their entirety for all purposes.

TECHNICAL FIELD

The present disclosure relates generally to the technological field of the Internet, specifically to the technological filed of social network service ("SNS"), and more particularly to method and terminal for editing information in SNS applications.

BACKGROUND

With the development of terminal technologies, SNS applications have been widely developed. End users can use SNS applications to edit information, e.g., to write weblogs and comments, etc., and to publish such edited information, thereby accomplishing interaction and sharing with other users. Usually, the editing of information in an SNS application is performed based on operations on individual terminals. For example, a user can log in an SNS weblog application to edit a weblog from a personal computer ("PC"). For example, a user may wish to include an audio file recorded by a mobile phone as part of the content of a weblog. In order to do that, the traditional way is for the user to first record a piece of audio information using a mobile phone's audio recording function and save the recorded audio information in the mobile phone. Then the user needs to connect the mobile phone to a PC terminal and save the recorded audio information into the PC terminal's storage space. Finally, the PC terminal can extract from its storage space the recorded audio information and import it into an editing area of an SNS weblog application. This process of editing information is too cumbersome and cannot meet users' actual need for convenient information editing. There is a need for method and terminal for convenient information editing in SNS applications so as to increase user loyalty to these applications.

SUMMARY OF THE DISCLOSURE

Embodiments of the present disclosure provide methods and terminals for editing information in SNS applications. Information editing can be accomplished via inter-terminal interactions. This simplifies the process of information editing operations, increases the convenience of information editing, and enhances user loyalty to the SNS applications.

An embodiment in a first aspect of the disclosure provides an SNS application information editing method. The method can comprise:

A command terminal sends a multimedia information obtaining command to an execution terminal associated with the command terminal while executing an editing operation in an editing area of an SNS application;

The execution terminal obtains multimedia information in accordance with the multimedia information obtaining command, and sends the obtained multimedia information to the command terminal; and The command terminal inserts the multimedia information into the editing area of the SNS application.

An embodiment in a second aspect of the disclosure provides an SNS application information editing method. The method can comprise:

A command terminal sends a multimedia information obtaining command to an execution terminal associated with the command terminal while executing an editing operation in an editing area of an SNS application;

The command terminal receives multimedia information obtained by the execution terminal, wherein the multimedia information is obtained by the execution terminal in accordance with the multimedia information obtaining command; and The command terminal inserts the multimedia information into the editing area of the SNS application.

An embodiment in a third aspect of the disclosure provides an SNS application information editing method. The method can comprise:

An execution terminal receives a multimedia information obtaining command from a command terminal associated with the execution terminal;

The execution terminal obtains multimedia information in accordance with the multimedia information obtaining command; and The execution terminal sends the multimedia information to the command terminal, enabling the command terminal to insert the multimedia information into an editing area of an SNS application.

An embodiment in a fourth aspect of the disclosure provides a command terminal. The command terminal can comprise:

A command module that sends a multimedia information obtaining command to an execution terminal associated with the command terminal while executing an editing operation in an editing area of an SNS application;

An information transmission module that receives multimedia information obtained by the execution module, wherein the multimedia information is obtained by the execution module in accordance with the multimedia information obtaining command; and An editing module that inserts the multimedia information into the editing area of the SNS application.

An embodiment in a fifth aspect of the disclosure provides an execution terminal. The execution terminal can comprise:

A command receiving module that receives a multimedia information obtaining module from a command terminal associated with the execution terminal; and An execution module that obtains multimedia information in accordance with the multimedia information obtaining command, and that sends the obtained multimedia information to the command terminal, enabling the command terminal to insert the multimedia information into an editing area of an SNS application.

An embodiment in a sixth aspect of the disclosure provides a computer-readable storage medium storing one or more programs. The one or more programs comprise instructions, which when executed by one or more computers, cause the one or more computers to carry out some or all of the steps in accordance with the various aspects of the disclosure described hereinabove.

According to embodiments of the present disclosure, a command terminal can send a multimedia information obtaining command to an execution terminal associated with the command terminal while executing an editing operation in an editing area in an SNS application, and the execution terminal can obtain multimedia information and send it to the command terminal. Because the command terminal can, in accordance with editing needs, directly obtain multimedia information from an associated execution terminal, this allows convenient multimedia information transfer between terminals, thereby simplifying the process of information editing operations, increasing the convenience of information editing, and enhancing user loyalty to the SNS application.

BRIEF DESCRIPTION OF THE DRAWINGS

In order to better illustrate embodiments of the present disclosure or technical solutions in the prior art, below is brief description of figures used to describe the embodiments or prior art. Obviously, what is described in the figures is merely some embodiments of the present disclosure. Persons of ordinary skill in the art can obtain other figures based on these figures without any creative effort.

DETAILED DESCRIPTION

In the following description of embodiments, reference is made to the accompanying drawings which form a part hereof, and in which it is shown by way of illustration specific embodiments of the disclosure that can be practiced. Obviously, the described embodiments are merely part of the embodiments of the present disclosure. It is to be understood that other embodiments can be used and structural changes can be made without creative effort from persons of ordinary skill in the art and without departing from the scope of the disclosed embodiments.

As used herein, an "SNS application" refers to any SNS application that can execute editing operations. Examples of such SNS applications include, but are not limited to, SNS weblog applications, SNS comment applications, SNS message applications, SNS microblog applications, and SNS blog applications. Examples of recording applications in accordance with various embodiments include, but are not limited to, audio recording applications, video recording applications, and camera shooting applications. Examples of multimedia information in accordance with various embodiments include, but are not limited to, audio information, image information, and video information.

According to embodiments of the present invention, terminals can include: smart devices such as PCs, tablet PCs, mobile phones, personal digital assistants, electronic readers, notebook computers, smart televisions, on-vehicle terminals, etc. As used herein, a "command terminal" refers to a terminal that sends a multimedia information obtaining command. The command terminal can be any one of the above-mentioned terminals. As used herein, an "execution terminal" refers to a terminal that executes a multimedia information obtaining process in accordance with the multimedia information obtaining command, and can be any one of the above-mentioned terminals. Preferably, an execution terminal is a terminal that comprises a recording application. A command terminal can be associated with an execution terminal. Methods of such association are well known to those skilled in the art. For example, a command terminal and an execution terminal can be associated with each other by each logging in an SNS application using same account information. Alternatively, the execution terminal can log in the SNS application using account information designated by the command terminal.

Below is a detailed introduction to information editing methods in SNS applications according to various embodiments of the present disclosure with references to FIGS. 1-7.

Figure 1:
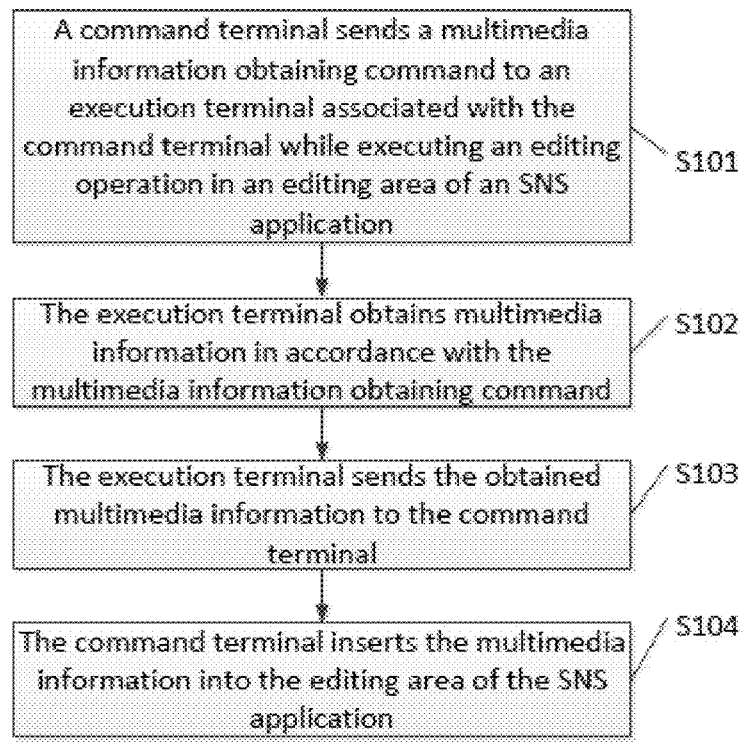
FIG. 1 is a flowchart illustrating an example of the flow of an SNS application information editing method according to various embodiments.

FIG. 1 is a flowchart illustrating an example of the flow of an SNS application information editing method according to various embodiments; the example illustrated in FIG. 1 is an information editing method in an SNS application executed through the interaction between a command terminal and an execution terminal. The method can comprise steps S101 to S104, as set forth below:

S101: a command terminal sends a multimedia information obtaining command to an execution terminal associated with the command terminal while executing an editing operation in an editing area of an SNS application;

According to some embodiments, a command terminal can log in an SNS application and execute an editing operation in an editing area of the SNS application. For example, the command terminal can execute weblog editing in an editing area of an SNS weblog application. If a user intends to insert multimedia information into the editing area, pursuant to conventional processing method, the user can directly import the multimedia information to be edited from a storage space of the command terminal. According to the present disclosure, however, the user can obtain multimedia information to be edited from an execution terminal associated with the command terminal, that is, by executing this step, the command terminal can send a multimedia information obtaining command to an execution terminal associated with the command terminal.

S102: the execution terminal obtains multimedia information in accordance with the multimedia information obtaining command;

According to some embodiments, the execution terminal can, in accordance with the multimedia information obtaining command, start a recording application to obtain recorded multimedia information. According to some other embodiments, the execution terminal can obtain stored multimedia information from its storage space.

S103: the execution terminal sends the obtained multimedia information to the command terminal;

According to some embodiments, the execution terminal can establish a communication connection with the command terminal. For example, the execution terminal can establish communication connection directly with the command terminal via local area network ("LAN"), Bluetooth or Near Field Communication ("NFC"), and directly sends the obtained multimedia information to the command terminal. According to some embodiments, the execution terminal can send the obtained multimedia information to the command terminal via a server.

S104: the command terminal inserts the multimedia information into the editing area of the SNS application.

Figure 2:
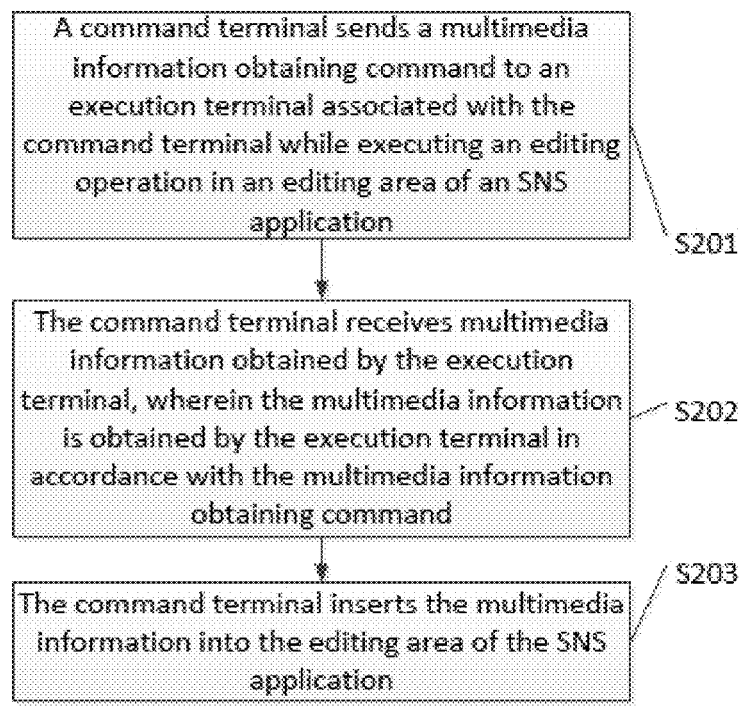
FIG. 2 is a flowchart illustrating an example of the flow of an SNS application information editing method according to various embodiments.

FIG. 2 is a flowchart illustrating an example of the flow of an SNS application information editing method according to various embodiments. The example illustrated in FIG. 2 is an information editing method in an SNS application executed by a command terminal. The method can comprise steps S201 to S203, as set forth below:

S201: a command terminal sends a multimedia information obtaining command to an execution terminal associated with the command terminal while executing an editing operation in an editing area of an SNS application;

S202: the command terminal receives multimedia information obtained by the execution terminal, wherein the multimedia information is obtained by the execution terminal in accordance with the multimedia information obtaining command;

According to some embodiments, the command terminal can establish a direct communication connection with the execution terminal. For example, the command terminal can establish communication connection directly with the execution terminal via LAN, Bluetooth or NFC, and directly receives the multimedia information from the execution terminal. According to some embodiments, the command terminal can establish a communication connection with an execution terminal via a server, and receive multimedia information obtained by the execution terminal and forwarded by the server.

S203: the command terminal inserts the multimedia information into the editing area of the SNS application.

Figure 3:
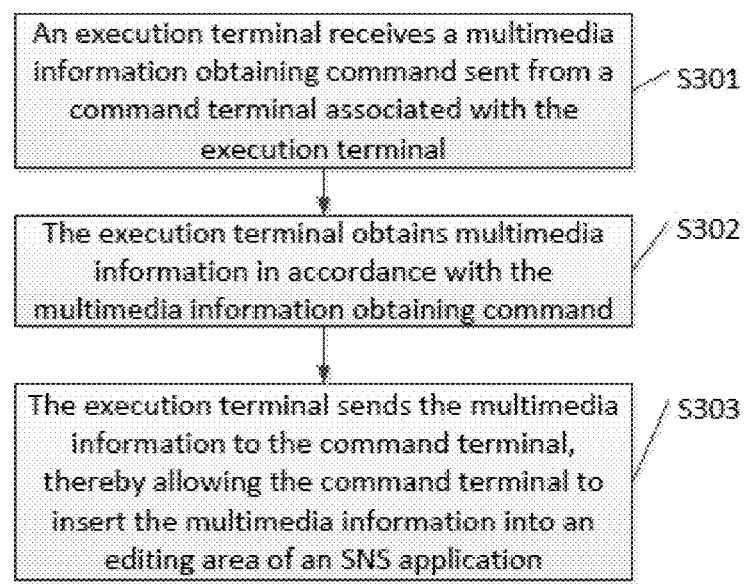
FIG. 3 is a flowchart illustrating an example of the flow of an SNS application information editing method according to various embodiments.

FIG. 3 is a flowchart illustrating an example of the flow of an SNS application information editing method according to various embodiments. The example illustrated in FIG. 3 is an information editing method in an SNS application executed by an execution terminal associated with a command terminal. The method can comprise steps S301 to S303, as set forth below:

S301: an execution terminal receives a multimedia information obtaining command from a command terminal associated with the execution terminal;

S302: the execution terminal obtains multimedia information in accordance with the multimedia information obtaining command; and S303: the execution terminal sends the multimedia information to the command terminal, enabling the command terminal to insert the multimedia information into an editing area of an SNS application.

Figure 4:
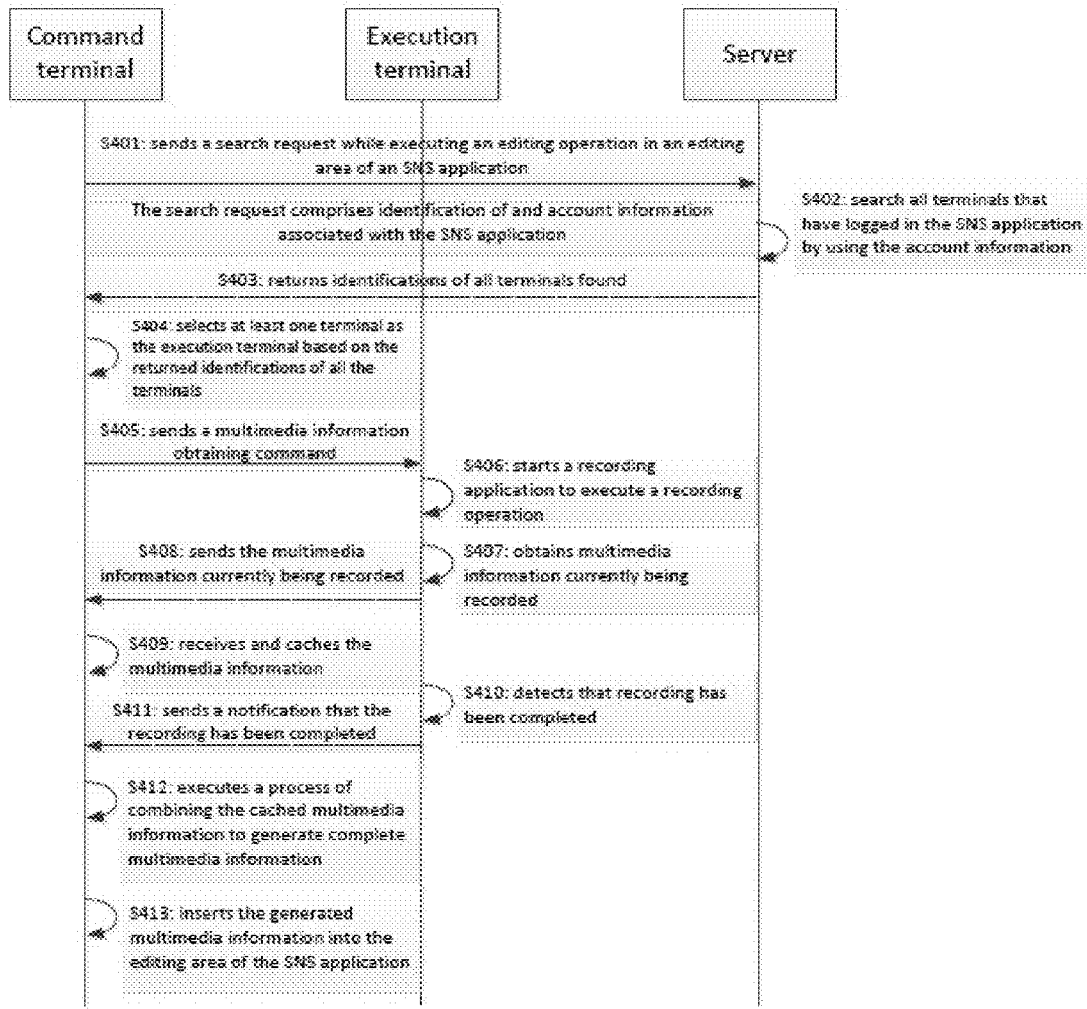
FIG. 4 is a flowchart illustrating an example of the flow of an SNS application information editing method according to various embodiments.

FIG. 4 is a flowchart illustrating an example of the flow of an SNS application information editing method according to various embodiments. The example illustrated in FIG. 4 is an information editing method in an SNS application executed through the interaction between a command terminal and an execution terminal. The method can comprise steps S401 to S413, as set forth below:

S401: the command terminal sends a search request to a server while executing an editing operation in an editing area of an SNS application to search for an execution terminal associated with the command terminal. The search request comprises identification of and account information associated with the SNS application;

S402: the server searches terminals logged into the SNS application using the account information;

According to some embodiments, when a terminal logs in an SNS application, the server can record the identification of the terminal logging in the SNS application, the identification of the SNS application and information relating to the account used by the terminal to log in the SNS application. According to these embodiments, the server can search from the content so recorded terminals logged into the SNS application using the account information, which terminals can include both terminals that are currently using the SNS application and terminals that are not currently using but have logged in the SNS application before.

S403: the server returns identifications of terminals found by it to the command terminal;

S404: the command terminal selects at least one found terminal other than itself as the execution terminal associated with it based on the identifications of the terminals returned by the server;

S405: the command terminal sends a multimedia information obtaining command to the execution terminal;

S406: the execution terminal starts a recording application in the execution terminal to execute a recording operation in accordance with the multimedia information obtaining command;

According to some embodiments, if the execution terminal is not currently using the SNS application, it can, upon receipt of the multimedia information obtaining command, log in the SNS application using the account information in accordance with a user's operation, and then start the recording application to execute the recording operation. According to some other embodiments, if the execution terminal uses the account information to log in the SNS application and is currently using the SNS application, it can directly start the recording application to execute the recording operation upon receipt of the multimedia information obtaining command.

S407: the execution terminal obtains multimedia information recorded by it;

S408: the execution terminal sends the recorded multimedia information to the command terminal;

Steps S407 and S408 represent an embodiment of the process of simultaneous recording and sending multimedia information being recorded, wherein an execution terminal can send multimedia information currently being recorded to a command terminal. According to some embodiments, the size of the multimedia information to be sent can be preset, such that each time when the multimedia information being recorded reaches the preset size, the execution terminal will send such multimedia information to the command terminal. Simultaneous recording and sending can mitigate any pressure imposed on the cache of the execution terminal, reduce the volume of data for each information transmission, and improve the efficiency of information transmission.

S409: the command terminal receives and caches the multimedia information from the execution terminal;

S410, the execution terminal detects that recording is complete;

According to some embodiments, the execution terminal can detect a user's operation of the video recording application and determine whether the recording operation is completed. For example, if the execution terminal detects that the user has exited from the recording application or that the user has pressed a button that ends the recording, it can determine that the recording is complete.

S411: the execution terminal sends notification that the recording is complete to the command terminal;

S412: upon receipt of the notification that the recording is complete from the execution terminal, the command terminal executes a process of combining the cached multimedia information to generate complete multimedia information;

S413: the command terminal inserts the generated complete multimedia information into the editing area of the SNS application.

In steps S411-S413, after receiving the notification that the recording is complete, the command terminal can learn that the execution terminal has completed the multimedia recording. Thereafter, the command terminal can combine the cached multimedia information to generate complete multimedia information and insert such complete multimedia information into the editing area of the SNS application so as to complete the editing operation. Based on the complete multimedia information, the completeness of the content edited can be ensured, thereby making it convenient for the user to browse the information.

According to some embodiments, in step S403, after the server returns the identifications of the terminals found by it to the command terminal, the command terminal can locally store the identifications of the terminals. When executing an information editing process in the SNS application the next time, as a result, steps S401-403 can be skipped, and the command terminal can read the identifications of the terminals directly from its local storage space and select from such terminals at least one terminal other than itself as the execution terminal associated with the command terminal for the purpose of completing the subsequent information editing process.

The following is a specific example illustrating an embodiment of an information editing method in an SNS application in accordance with the present disclosure.

Assume that the command terminal is a PC, the SNS application is an SNS weblog application, and the execution terminal is a mobile phone. A PC terminal user logged in the SNS weblog application using account information comprising a user name of Admin and a password of admin, and started editing a weblog in an editing area of the SNS application. If the user intends to use the recording function of the mobile phone to record audio information and use the audio information as part of the content of the weblog, then the information editing process for this embodiment can comprise the following steps:

The PC terminal sends a search request to a server to search an execution terminal associated with the command terminal. The search request comprises identification of and account information associated with the SNS weblog application. The server searches terminals logged into the SNS application using the account information and returns identifications of the terminals to the PC terminal, wherein the identifications of the terminals comprise the identification of the mobile phone. The PC terminal selects the mobile phone as the execution terminal associated with the PC terminal.

The PC terminal sends a multimedia information obtaining command to the mobile phone. If the mobile phone is currently using the SNS weblog application, the mobile phone will, in accordance with the multimedia information obtaining command, start a recording application in the mobile phone to execute a recording operation and send recorded audio information to the PC terminal. If the mobile phone currently has not logged in the SNS weblog application, the mobile phone will, in accordance with the multimedia information obtaining command, first log in the SNS weblog application using the account information and then start the recording application in the mobile phone to execute the recording operation and send the recorded audio information to the PC terminal. The PC terminal receives and caches the multimedia information from the mobile phone.

The mobile phone sends notification that recording is complete to the PC terminal when it detects that the recording is complete. Upon receipt of the notification that the recording is complete from the mobile phone, the PC terminal combines the cached multimedia information to generate complete multimedia information. The PC terminal inserts the complete multimedia information into the editing area of the SNS weblog application so as to complete the weblog editing operation. The edited weblog comprises complete recorded audio information. The PC terminal can store or publish the edited weblog or otherwise process the edited weblog in any number of ways.

Figure 5:
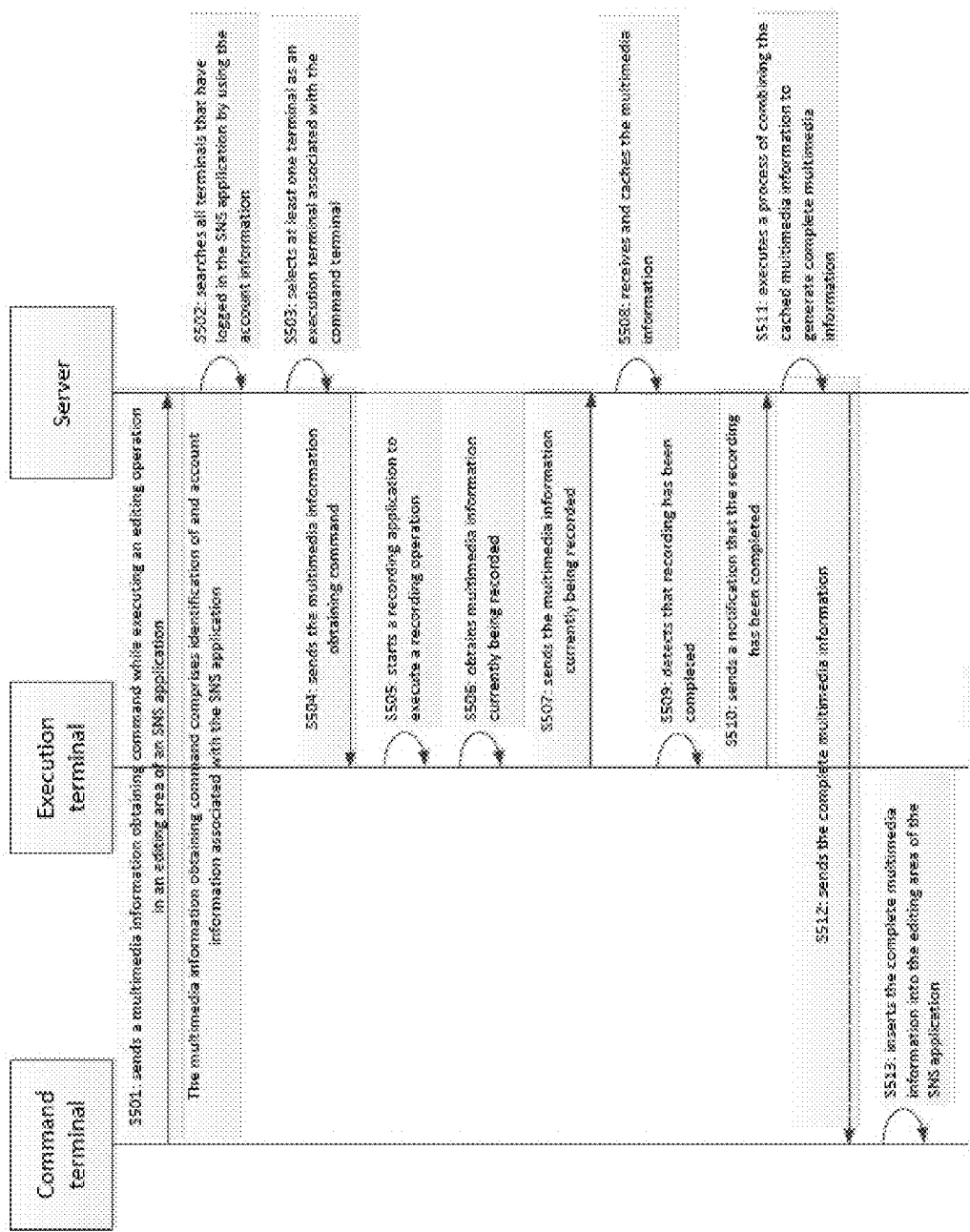
FIG. 5 is a flowchart illustrating an example of the flow of an SNS application information editing method according to various embodiments.

FIG. 5 is a flowchart illustrating an example of the flow of an SNS application information editing method according to various embodiments. The example illustrated in FIG. 5 is an information editing method in an SNS application executed through the interaction between a command terminal and an execution terminal. The method can comprise steps S501 to S513, as set forth below:

S501: the command terminal sends a multimedia information obtaining command to a server while executing an editing operation in an editing area of an SNS application. The multimedia information obtaining command comprises identification of and account information associated with the SNS application;

S502: the server searches terminals logged into the SNS application using the account information;

S503: the server selects at least one found terminal other than the command terminal itself from the terminals found by the server as the execution terminal associated with the command terminal;

S504: the server sends the multimedia information obtaining command to the execution terminal;

S505: the execution terminal starts a recording application in the execution terminal to execute a recording operation in accordance with the multimedia information obtaining command;

S506: the execution terminal obtains multimedia information recorded by it;

S507: the execution terminal sends the recorded multimedia information to the server;

S508: the server receives and caches the multimedia information from the execution terminal;

S509, the execution terminal detects that recording is complete;

S510: the execution terminal sends notification that the recording is complete to the server;

S511: upon receipt of the notification that the recording is complete from the execution terminal, the server executes a process of combining the cached multimedia information to generate complete multimedia information;

S512: the server sends the complete multimedia information so generated to the command terminal;

S513: the command terminal inserts the complete multimedia information received by it into the editing area region of the SNS application.

There are several differences between the example illustrated in FIG. 5 and that illustrated in FIG. 4. For example, after finding terminals logged into the SNS application using the account information, the server is not required to return identifications of the terminals to the command terminal. Instead, the server selects at least one found terminal as the execution terminal associated with the command terminal and sends the multimedia information obtaining command to the execution terminal. This simplifies the information interaction process. In addition, the server receives and caches the multimedia information from the execution terminal, and combines the cached multimedia information to generate complete multimedia information after receiving notification that recording is complete from the execution terminal. Because the forgoing processes of receiving, caching and combination processing are all completed on the server, this reduces the processing burden on the command terminal.

The following is a specific example illustrating an embodiment of an information editing method in a SNS application in accordance with the present disclosure.

Assume that the command terminal is a PC, the SNS application is an SNS weblog application, and the execution terminal is a mobile phone. A PC terminal user logged in the SNS weblog application using account information comprising a user name of Admin and a password of admin, and started editing a weblog in an editing area of the SNS application. If the user intends to use the recording function of the mobile phone to record audio information and use the audio information as part of the content of the weblog, then the information editing process for this embodiment can comprise the following steps:

The PC terminal sends a multimedia information obtaining command to a server. The multimedia information obtaining command comprises identification of and account information associated with the SNS application. The server searches terminals (including the mobile phone) logged into the SNS application using the account information. The server selects the mobile phone from the terminals found by it as the execution terminal associated with the PC terminal.

The server sends the multimedia information obtaining command to the mobile phone. If the mobile phone is currently using the SNS weblog application, the mobile phone will, in accordance with the multimedia information obtaining command, start a recording application in the mobile phone to execute a recording operation, and then send recorded audio information to the server. If the mobile phone currently has not logged in the SNS weblog application, the mobile phone will, in accordance with the multimedia information obtaining command, first log in the SNS weblog application using the account information, and then start the recording application in the mobile phone to execute the recording operation, and send the recorded audio information to the server. The server will receive and cache the multimedia information from the mobile phone.

The mobile phone sends notification that recording is complete to the server when it detects that the recording is complete. After receiving the notification that the recording is complete from the mobile phone, the server can combine the cached multimedia information to generate complete multimedia information and then send the complete multimedia information to the PC terminal. The PC terminal inserts the complete multimedia information from the server into the editing area of the SNS weblog application so as to complete the weblog editing operation. The edited weblog comprises complete recorded audio information. The PC terminal can store or publish the edited weblog or otherwise process the edited weblog in any number of ways.

Figure 6:
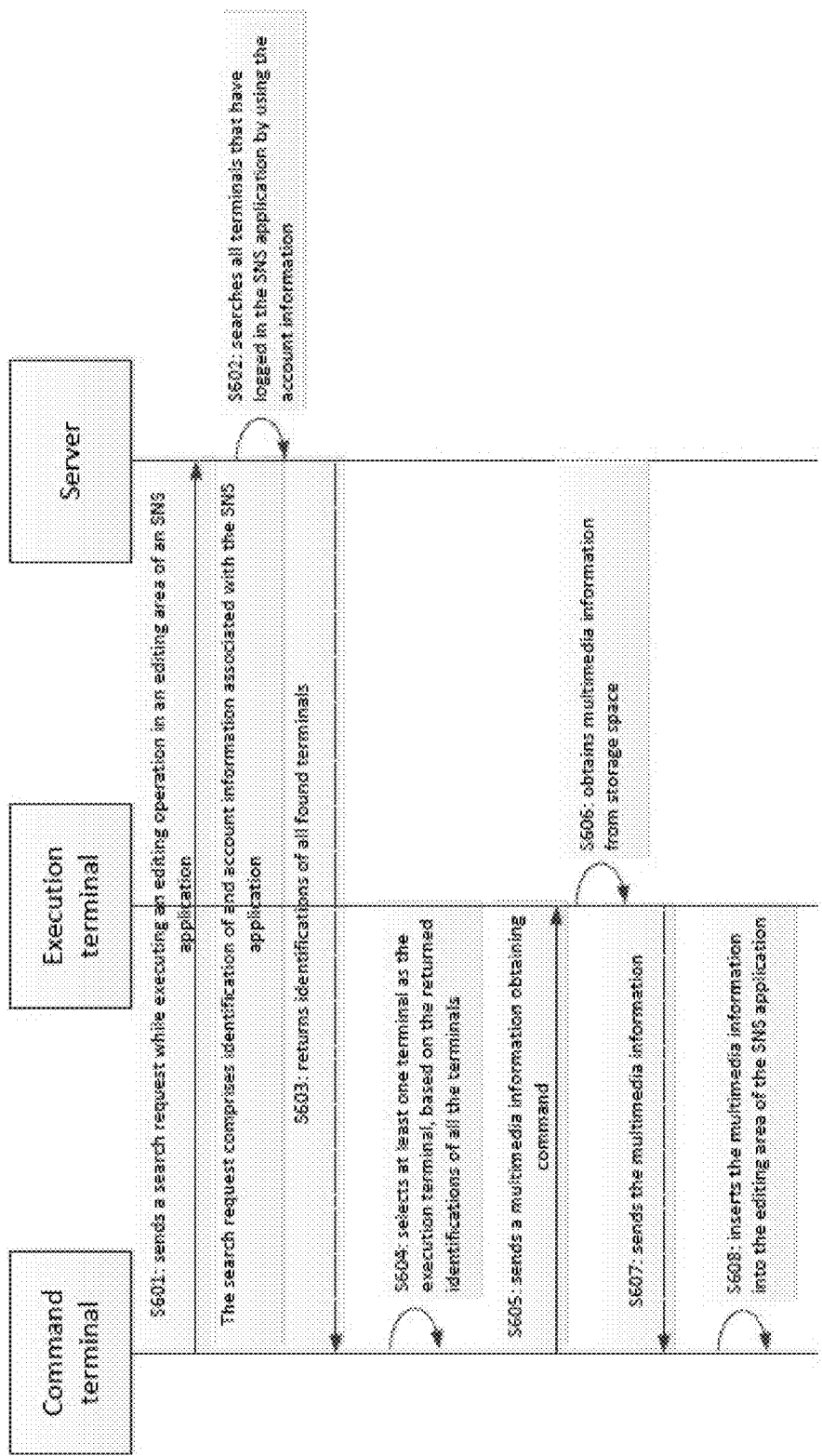
FIG. 6 is a flowchart illustrating an example of the flow of an SNS application information editing method according to various embodiments.

FIG. 6 is a flowchart illustrating an example of the flow of an SNS application information editing method according to various embodiments. The example illustrated in FIG. 6 is an information editing method in an SNS application executed through the interaction between a command terminal and an execution terminal. The method can comprise steps S601 to S608, as set forth below.

S601: the command terminal sends a search request to a server while executing an editing operation in an editing area in the SNS application. The search request comprises identification of and account information associated with the SNS application;

S602: the server searches terminals logged into the SNS application using the account information;

S603: the server returns identifications of the terminals found by it to the command terminal;

S604: the command terminal, based on the identifications of the terminals returned by the server, selects at least one found terminal other than itself as the execution terminal associated with the command terminal;

S605: the command terminal sends a multimedia information obtaining command to the execution terminal;

S606: the execution terminal obtains multimedia information from its storage space in accordance with the multimedia information obtaining command;

S607: the execution terminal sends the multimedia information obtained by it to the command terminal;

S608: the command terminal inserts the multimedia information into the editing area of the SNS application.

According to some embodiments, in step S603, after the server returns the identifications of the terminals found by it to the command terminal, the command terminal can locally store the identifications of the terminals. When executing an information editing process in the SNS application the next time, as a result, steps S601-603 can be skipped, and the command terminal can read the identifications of the terminals directly from its local storage space and select from such terminals at least one terminal other than itself as the execution terminal associated with the command terminal for the purpose of completing the subsequent information editing process.

The following is a specific example illustrating an embodiment of an information editing method in a SNS application in accordance with the present disclosure.

Assume that the command terminal is a PC, the SNS application is an SNS weblog application, and the execution terminal is a mobile phone. A PC terminal user logged in the SNS weblog application using account information comprising a user name of Admin and a password of admin, and started editing a weblog in an editing area of the SNS application. If the user intends to use a piece of audio information stored in the mobile phone as part of the content of the weblog, then the information editing process for this embodiment can comprise the following steps:

The PC terminal sends a search request to the server to search for an execution terminal associated with the command terminal. The search request comprises identification of and account information associated with the SNS weblog application. The server searches terminals logged into the SNS application using the account information and returns identifications of the terminals to the PC terminal, wherein the identifications of the terminals comprise the identification of the mobile phone. The PC terminal selects the mobile phone as the execution terminal associated with the PC terminal.

The PC terminal sends a multimedia information obtaining command to the mobile phone. If the mobile phone is currently using the SNS weblog application, the mobile phone will export audio information that has been stored by it in its storage space and send the same to the PC terminal. If the mobile phone currently has not logged in the SNS weblog application, the mobile phone will, in accordance with the multimedia information obtaining command, first log in the SNS weblog application using the account information, and then export the audio information that has been stored by it in its storage space via the SNS weblog application and send the same to the PC terminal. The PC terminal inserts the multimedia information received by it into the editing area of the SNS weblog application so as to complete the weblog editing operation. The edited weblog comprises complete audio information. The PC terminal can store or publish the edited weblog or otherwise process the edited weblog in any number of ways.

Figure 7:
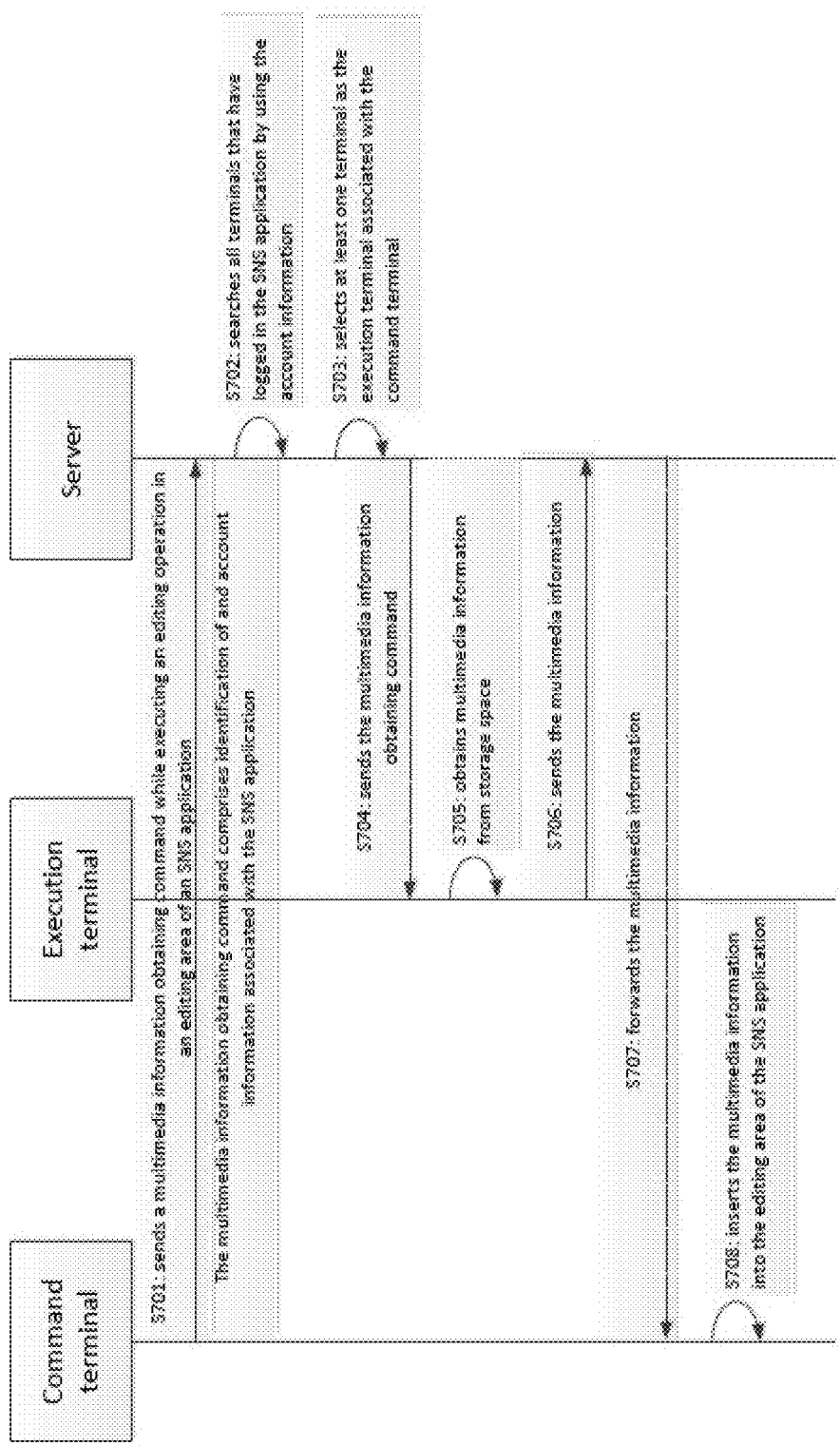
FIG. 7 is a flowchart illustrating an example of the flow of an SNS application information editing method according to various embodiments.

FIG. 7 is a flowchart illustrating an example of the flow of an SNS application information editing method according to various embodiments. The example illustrated in FIG. 7 is an information editing method in the SNS application executed through the interaction between a command terminal and an execution terminal. The method can comprise steps S701 to S708, as set forth below:

S701: the command terminal sends a multimedia information obtaining command to a server while executing an editing operation in an editing area of an SNS application. The multimedia information obtaining command can comprise identification of and account information associated with the SNS application;

S702: the server searches terminals logged into the SNS application using the account information;

S703: the server selects at least one found terminal other than the command terminal from the terminals found by the server as the execution terminal associated with the command terminal.

S704: the server sends the multimedia information obtaining command to the execution terminal;

S705: the execution terminal obtains multimedia information from its storage space in accordance with the multimedia information obtaining command;

S706: the execution terminal sends the obtained multimedia information to the server;

S707: the server forwards the multimedia information to the command terminal;

S708: the command terminal inserts the multimedia information into the editing area of the SNS application.

There are several differences between the example illustrated in FIG. 7 and that illustrated in FIG. 6. For example, after finding terminals logged into the SNS application using the account information, the server is not required to return identifications of the terminals to the command terminal. The server selects at least one found terminal as the execution terminal associated with the command terminal and sends the multimedia information obtaining command to the execution terminal. This simplifies the information interaction process. In addition, the server can forward the multimedia information from the execution terminal, which will enable an ordinary transmission of the multimedia information even when the command terminal and the execution terminal cannot establish a communication connection directly.

The following is a specific example illustrating an embodiment of an information editing method in a SNS application in accordance with the present disclosure.

Assume that the command terminal is a PC, the SNS application is an SNS weblog application, and the execution terminal is a mobile phone. A PC terminal user logged in the SNS weblog application using account information comprising a user name of Admin and a password of admin, and started editing a weblog in an editing area of the SNS application. If the user intends to use a piece of audio information stored in the mobile phone as part of the content of the weblog, then the information editing process for this embodiment can comprise the following steps:

The PC terminal sends a multimedia information obtaining command to a server. The multimedia information obtaining command comprises identification of and account information associated with the SNS application. The server searches terminals (including the mobile phone) logged into the SNS application using the account information. The server selects the mobile phone from the terminals found by the server as the execution terminal associated with the PC terminal.

The server sends the multimedia information obtaining command to the mobile phone. If the mobile phone is currently using the SNS weblog application, the mobile phone will export the audio information that has been stored by it in its storage space and send the same to the server; if the mobile phone currently has not logged in the SNS weblog application, the mobile phone will, in accordance with the multimedia information obtaining command, first log in the SNS weblog application using the account information, and then export the audio information that has been stored by it in its storage space via the SNS weblog application and send the same to the server. The server forwards the received multimedia information to the PC terminal. The PC terminal inserts the multimedia information received by it into the editing area of the SNS weblog application to complete the weblog editing operation. The edited weblog comprises complete audio information. The PC terminal can store or publish the edited weblog or otherwise process the edited weblog in any number of ways well known to those skilled in the art.

According to the above example method embodiments, the command terminal described in the embodiments of the present disclosure sends a multimedia information obtaining command to an execution terminal associated with the command terminal while executing an editing operation in an SNS application, and the execution terminal obtains multimedia information and sends the same to the command terminal. Because the command terminal can obtain multimedia information directly from its associated execution terminal in accordance with editing needs, convenient transmission of multimedia information between terminals can be accomplished, which simplifies the process of information editing, increases the convenience of information editing, and enhances the SNS application's user loyalty.

Some or all of the steps of an SNS application information editing method, such as those illustrated in FIGS. 1-7 and described in detail hereinabove, can be carried out by executing a program. The program can be stored in a computer-readable storage medium. Accordingly, the present disclosure discloses a computer-readable storage medium in accordance with various embodiments.

Figure 8:
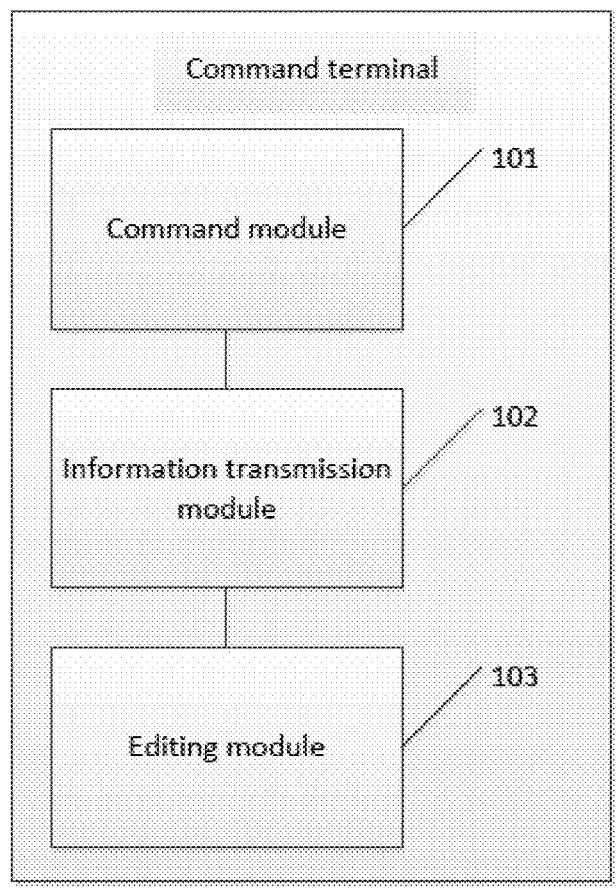
FIG. 8 is a schematic diagram illustrating an example of an arrangement of a command terminal according to various embodiments.
Figure 9:
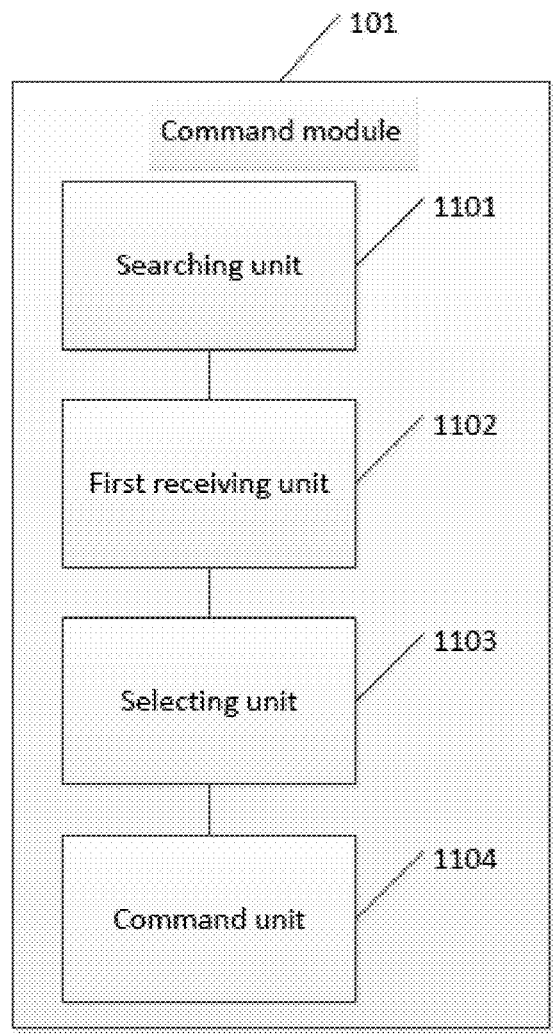
FIG. 9 is a schematic diagram illustrating an example of an arrangement of a command module illustrated in FIG. 8.
Figure 10:
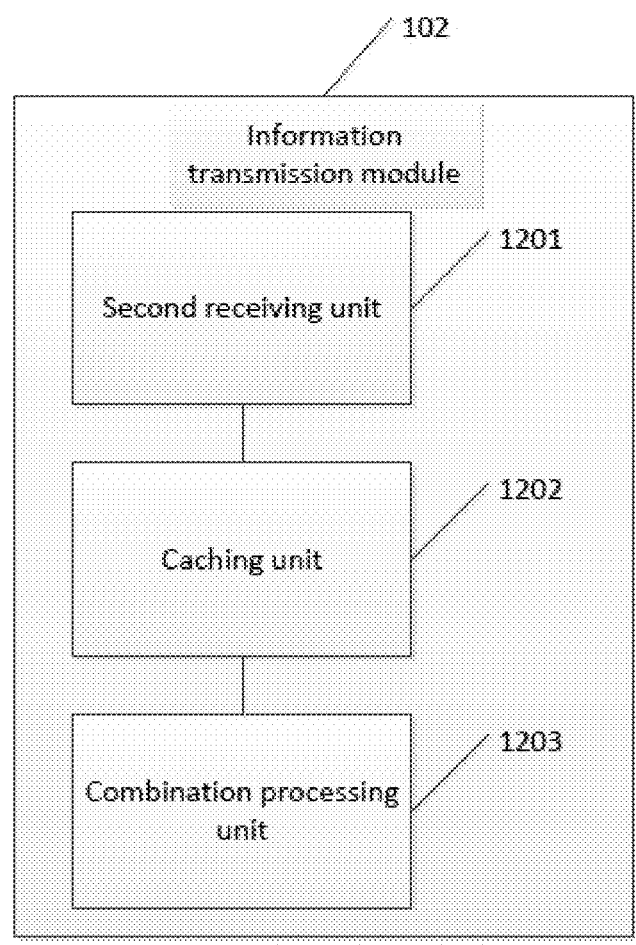
FIG. 10 is a schematic diagram illustrating an example of an arrangement of an information transmission module illustrated in FIG. 8.

FIGS. 8-10 illustrate example arrangements of a command terminal according to various embodiments. The command terminals illustrated in FIGS. 8-10 and described below can be used in the various methods described in detail hereinabove.

FIG. 8 is a schematic diagram illustrating an example of an arrangement of a command terminal according to various embodiments. The command terminal can comprise: a command module 101, an information transmission module 102, and an editing module 103.

The command module 101 sends a multimedia information obtaining command to an execution terminal associated with the command terminal while the command terminal is executing an editing operation in an editing area of an SNS application.

The command terminal can log in the SNS application and start an editing operation in the editing area of the SNS application, e.g., to edit a weblog in an editing area of an SNS weblog application. If a user intends to insert multimedia information into the editing area, pursuant to conventional processing method, the user may directly import the multimedia information to be edited from the storage space of the command terminal; however, according to embodiments of the present disclosure, the user can obtain the multimedia information to be edited from an execution terminal associated with the command terminal, that is, the command module 101 can send a multimedia information obtaining command to an execution terminal associated with the command terminal.

The command module 101 can have several arrangements according to various embodiments:

FIG. 9 is a schematic diagram illustrating an example of an arrangement of a command module illustrated in FIG. 8. The command module 101 can comprise: a searching unit 1101, a first receiving unit 1102, a selecting unit 1103 and a command unit 1104.

The searching unit 1101 sends a search request to a server while the command terminal is executing an editing operation in an editing area of an SNS application to search an execution terminal associated with the command terminal. The search request can comprise identification of and account information associated with the SNS application;

The first receiving unit 1102 receives identifications of terminals logged into the SNS application using the account information returned by the server;

The selecting unit 1103 selects at least one terminal other than the command terminal as the execution terminal associated with the command terminal based on the identifications of the terminals returned by the server;

The command unit 1104 sends a multimedia information obtaining command to the execution terminal.

According to some embodiments, the command module 101 can send the multimedia information obtaining command to a server. The multimedia information obtaining command can comprise identification of and account information associated with an SNS application, which can allow the server to select at least one terminal other than the command terminal as the execution terminal associated with the command terminal from terminals logged into the SNS application using the account information, and to send the multimedia information obtaining command to the execution terminal.

The information transmission module 102 receives multimedia information obtained by the execution terminal, wherein the multimedia information is obtained in accordance with the multimedia information obtaining command;

According to some embodiments, the command terminal can directly establish a communication connection with the execution terminal and the information transmission module 102 can directly receive the multimedia information from the execution terminal. According to some other embodiments, the command terminal can establish a communication connection with the execution terminal via a server and the information transmission module 102 can receive the multimedia information obtained by the execution terminal as forwarded by the server.

The information transmission module 102 can have several arrangements according to various embodiments:

FIG. 10 is a schematic diagram illustrating an example of an arrangement of an information transmission module illustrated in FIG. 8. The information transmission module 102 can comprise: a second receiving unit 1201, a caching unit 1202, and a combination processing unit 1203.

The second receiving unit 1201 receives recorded multimedia information, wherein the recorded multimedia information is obtained by the execution terminal by starting a recording application in accordance with the multimedia information obtaining command;

The caching unit 1202 caches the received multimedia information;

The combination processing unit 1203 executes a process of combining the cached multimedia information to generate complete multimedia information upon its receipt of notification that recording of the multimedia information is complete from the execution terminal.

According to some embodiments, the information transmission module 102 can receive complete multimedia information generated by a server, wherein the complete multimedia information is generated by a server in accordance with multimedia information recorded by the execution terminal.

According to some other embodiments, the information transmission module 102 can receive multimedia information obtained by an execution terminal from its storage space. According to yet some other embodiments, the information transmission module 102 can receive information obtained by an execution terminal from its storage space as forwarded by a server.

The editing module 103 inserts the multimedia information into the editing area of the SNS application.

The functions of each functional module in the command terminal according to various embodiments can be specifically implemented in accordance with the forgoing methods and the implementation of those functions has been described hereinabove in the forgoing exemplary method embodiments.

According to the exemplary embodiment of a command terminal set forth above, the command terminal sends a multimedia information obtaining command to an execution terminal associated with the command terminal while executing an editing operation in an SNS application, and the execution terminal sends obtained multimedia information to the command terminal. Because the command terminal can directly obtain multimedia information from the associated execution terminal in accordance with editing needs, convenient multimedia information transmission between terminals can be accomplished, which simplifies the process of information editing operation, increases the convenience of information editing, and enhances the SNS application's user loyalty.

Figure 11:
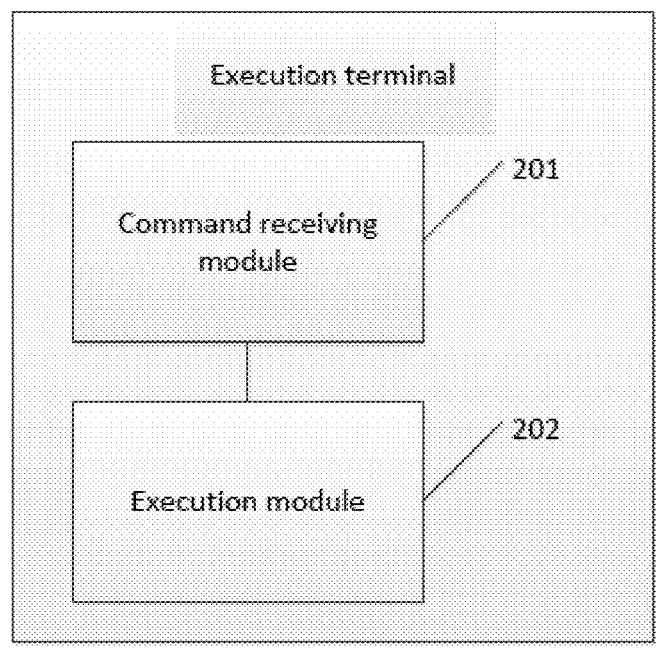
FIG. 11 is a schematic diagram illustrating an example of an arrangement of an execution terminal according to various embodiments.
Figure 12:
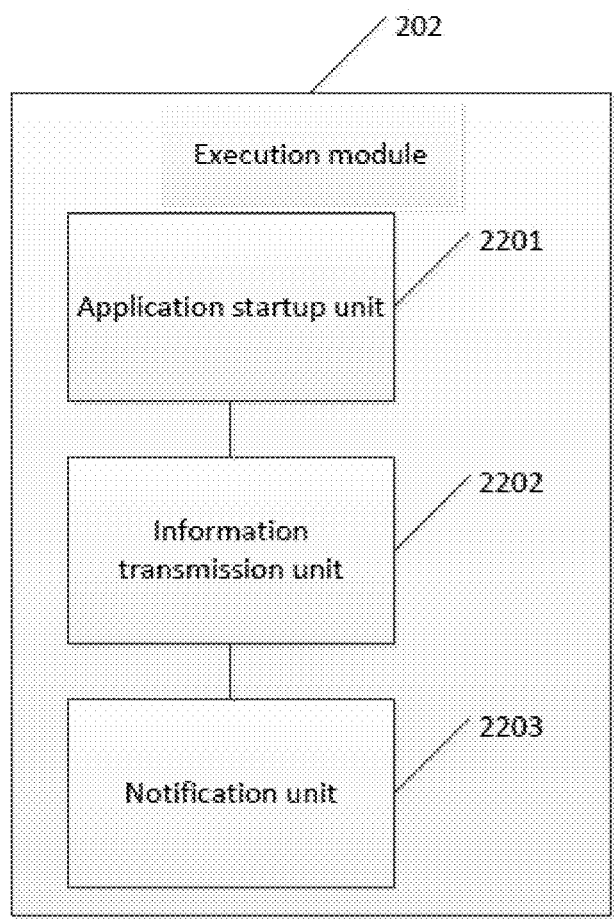
FIG. 12 is a schematic diagram illustrating an example of an arrangement of an execution module illustrated in FIG. 11.
Figure 13:
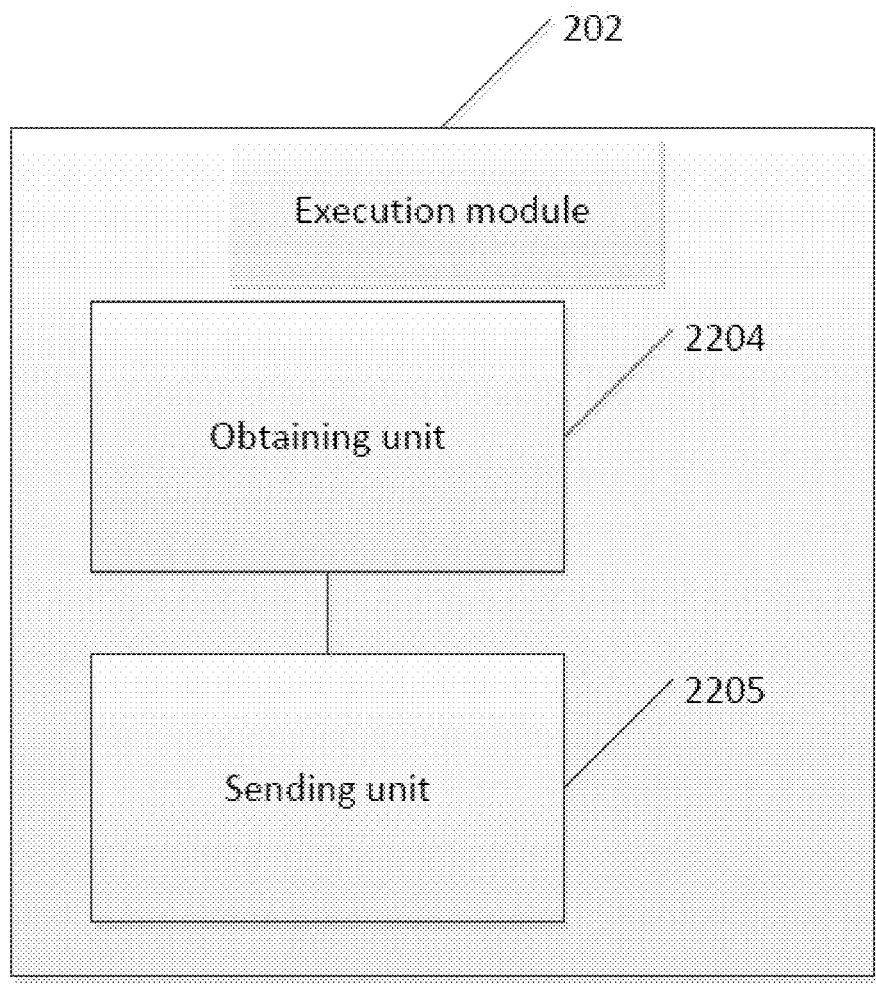
FIG. 13 is a schematic diagram illustrating an example of an arrangement of an execution module illustrated in FIG. 11.

FIGS. 11-13 illustrate example arrangements of an execution terminal according to various embodiments. The execution terminals illustrated in FIGS. 11-13 and described below can be used in the various methods described in detail hereinabove, as well as in the various exemplary command terminal embodiments described in detail hereinabove.

FIG. 11 is a schematic diagram illustrating an example of an arrangement of an execution terminal according to various embodiments. The execution terminal can comprise: a command receiving module 201 and an execution module 202.

The command receiving module 201 receives a multimedia information obtaining command from a command terminal associated with the execution terminal;

The execution module 202 obtains multimedia information in accordance with the multimedia information obtaining command and sends the obtained multimedia information to the command terminal enabling the command terminal to insert the multimedia information into an editing area of an SNS application.

The execution module 202 can have several arrangements according to various embodiments:

FIG. 12 is a schematic diagram illustrating an example of an arrangement of an execution module illustrated in FIG. 11. The execution module can comprise: an application startup unit 2201, an information transmission unit 2202 and a notification unit 2203.

The application startup unit 2201 starts, in accordance with a multimedia information obtaining command, a recording application in the execution terminal to execute a recording operation;

The information transmission unit 2202 obtains recorded multimedia information and sends the same to the command terminal enabling the command terminal to receive and cache the recorded multimedia information; or obtains the recorded multimedia information and sends the same to a server enabling the server to receive and cache the recorded multimedia information;

The notification unit 2203 sends notification that recording is complete to the command terminal when it detects that the recording is complete, enabling the command terminal to, in accordance with the notification that the recording is complete, execute a process of combining the cached multimedia information to generate complete multimedia information; or sends notification that the recording is complete to a server when it detects that the recording is complete, enabling the server to, in accordance with the notification that the recording is complete, execute a process of combining the cached multimedia information to generate complete multimedia information and to send the same to the command terminal.

FIG. 13 is a schematic diagram illustrating an example of an arrangement of an execution module illustrated in FIG. 11. The execution module 202 can comprise: obtaining unit 2204 and sending unit 2205.

The obtaining unit 2204 obtains the multimedia information from its storage space in accordance with the multimedia information obtaining command;

The sending unit 2205 sends the obtained multimedia information to the command terminal; or forwards the obtained multimedia information to the command terminal via a server.

The functions of each functional module in the execution terminal according to various embodiments can be specifically implemented in accordance with the forgoing methods and the implementation of those functions has been described hereinabove in the forgoing exemplary method embodiments.

According to the above exemplary execution terminal embodiments, the command terminal described in the embodiments of the present disclosure sends a multimedia information obtaining command to an execution terminal associated with the command terminal while executing an editing operation in an SNS application, and the execution terminal obtains multimedia information and sends the same to the command terminal. Because the command terminal can obtain multimedia information directly from its associated execution terminal in accordance with editing needs, convenient transmission of multimedia information between terminals can be accomplished, which simplifies the process of information editing, increases the convenience of information editing, and enhances the SNS application's user loyalty.

Persons of ordinary skill in the art can readily appreciate that all or part of the steps of the methods described in the embodiments above can be executed by relevant hardware instructed by a program that may be stored in a computer-readable memory medium. The readable memory medium may be, for example, a read-only memory ("ROM"), a random access memory ("RAM"), a magnetic disk or a compact disc.

What has been disclosed is merely preferred embodiments of the present disclosure and cannot be used to limit the scope of the claims of the present disclosure. Various changes and modifications will become apparent to those skilled in the art. Such changes and modifications are to be understood as being included within the scope of the disclosed embodiments as defined by the appended claims.

What is claimed is:

1. A social network service ("SNS") application information editing method comprising:
   sending a multimedia information obtaining command from a command terminal to an execution terminal associated with the command terminal when the command terminal is executing an editing operation in an editing area of the SNS application;
   obtaining multimedia information by the execution terminal in accordance with the multimedia information obtaining command;
   sending the multimedia information from the execution terminal to the command terminal;
   and entering the multimedia information into the editing area of the SNS application by the command terminal;
   wherein obtaining the multimedia information by the execution terminal in accordance with the multimedia information obtaining command and sending the multimedia information from the execution terminal to the command terminal comprise:
   starting a recording application in the execution terminal by the execution terminal to execute a recording operation in accordance with the multimedia information obtaining command;
   obtaining by the execution terminal multimedia information currently being recorded;
   sending the multimedia information currently being recorded from the execution terminal to the command terminal;
   sending notification that recording is complete from the execution terminal to the command terminal when the execution terminal detects that the recording is complete;
   receiving and caching by the command terminal the multimedia information sent from the execution terminal;
   and combining the cached multimedia information by the command terminal when the command terminal receives the notification that the recording is complete sent from the execution terminal, thereby generating complete multimedia information;
   wherein the recording application comprises at least one application selected from a group consisting of:
   an audio recording application, a video recording application, and a camera shooting application;
   and the multimedia information comprises at least one type of information selected from a group consisting of: audio information, image information, and video information.

2. The method of claim 1, wherein sending the multimedia information obtaining command comprises:
   sending a search request from the command terminal to a server to search for the execution terminal associated with the command terminal, the search request comprising identification of and account information associated with the SNS application;
   searching by the server terminals logged into the SNS application using the account information;

returning from the server to the command terminal identifications of found the execution terminals;

selecting at least one execution terminal other than the command terminal by the command terminal as the execution terminal associated with the command terminal based on the identifications of the terminals received from the server;

and sending the multimedia information obtaining command to the execution terminal.

3. The method of claim 1, wherein sending the multimedia information obtaining command from the command terminal to the execution terminal associated with the command terminal comprises:

sending the multimedia information obtaining command from the command terminal to a server, the multimedia information obtaining command comprising identification of and account information associated with the SNS application;

searching by the server terminals logged into the SNS application using the account information;

selecting by the server at least one found terminal other than the command terminal as the execution terminal associated with the command terminal;

and sending the multimedia information obtaining command from the server to the execution terminal.

4. The method of claim 3, wherein obtaining the multimedia information by the execution terminal in accordance with the multimedia information obtaining command and sending the multimedia information from the execution terminal to the command terminal comprise:

starting the recording application in the execution terminal by the execution terminal to execute a recording operation in accordance with the multimedia information obtaining command;

obtaining by the execution terminal multimedia information currently being recorded; sending the multimedia information currently being recorded from the execution terminal to the server;

sending notification that recording is complete from the execution terminal to the server when the execution terminal detects that the recording is complete; receiving and caching by the server the multimedia information sent from the execution terminal;

combining the cached multimedia information by the server when the server receives the notification that the recording is complete sent from the execution terminal, thereby generating complete multimedia information;

and sending the complete multimedia information from the server to the command terminal.

5. The method of claim 2 wherein obtaining the multimedia information by the execution terminal in accordance with the multimedia information obtaining command and sending the multimedia information from the execution terminal to the command terminal comprise:

obtaining the multimedia information from storage space of the execution terminal by the execution terminal in accordance with the multimedia information obtaining command;

and sending the obtained multimedia information from the execution terminal to the command terminal, or sending the obtained multimedia information from the execution terminal to the command terminal via the server.

6. A social network service ("SNS") application information editing method comprising:

sending a multimedia information obtaining command from a command terminal to an execution terminal associated with the command terminal when the command terminal is executing an editing operation in an editing area of the SNS application;

receiving multimedia information by the command terminal, the multimedia information having been obtained by the execution terminal in accordance with the multimedia information obtaining command;

and inserting the multimedia information into the editing area of the SNS application by the command terminal;

wherein obtaining the multimedia information by the execution terminal in accordance with the multimedia information obtaining command and sending the multimedia information from the execution terminal to the command terminal comprise:

starting a recording application in the execution terminal by the execution terminal to execute a recording operation in accordance with the multimedia information obtaining command;

obtaining by the execution terminal multimedia information currently being recorded;

sending the multimedia information currently being recorded from the execution terminal to the command terminal;

sending notification that recording is complete from the execution terminal to the command terminal when the execution terminal detects that the recording is complete;

receiving and caching by the command terminal the multimedia information sent from the execution terminal;

and combining the cached multimedia information by the command terminal when the command terminal receives the notification that the recording is complete sent from the execution terminal, thereby generating complete multimedia information;

wherein the recording application comprises at least one application selected from a group consisting of:

an audio recording application, a video recording application, and a camera shooting application;

and the multimedia information comprises at least one type of information selected from a group consisting of: audio information, image information, and video information.

7. A social network service ("SNS") application information editing method comprising:

receiving a multimedia information obtaining command by an execution terminal, the multimedia information obtaining command having been sent from a command terminal associated with the execution terminal, obtaining multimedia information by the execution terminal in accordance with the multimedia information obtaining command, and sending the obtained multimedia information from the execution terminal to the command terminal, enabling the command terminal to insert the multimedia information into an editing area of the SNS application;

wherein obtaining the multimedia information by the execution terminal in accordance with the multimedia information obtaining command and sending the multimedia information from the execution terminal to the command terminal comprise:

starting a recording application in the execution terminal by the execution terminal to execute a recording operation in accordance with the multimedia information obtaining command;

obtaining by the execution terminal multimedia information currently being recorded;

sending the multimedia information currently being recorded from the execution terminal to the command terminal;

sending notification that recording is complete from the execution terminal to the command terminal when the execution terminal detects that the recording is complete;

receiving and caching by the command terminal the multimedia information sent from the execution terminal;

and combining the cached multimedia information by the command terminal when the command terminal receives the notification that the recording is complete sent from the execution terminal, thereby generating complete multimedia information;

wherein the recording application comprises at least one application selected from a group consisting of:

an audio recording application, a video recording application, and a camera shooting application;

and the multimedia information comprises at least one type of information selected from a group consisting of: audio information, image information, and video information.

\* \* \* \* \*